United States Patent
Fleischer et al.

(10) Patent No.: US 7,242,948 B2
(45) Date of Patent: Jul. 10, 2007

(54) PROVIDING LOCATION BASED DIRECTORY NUMBERS FOR PERSONALIZED SERVICES

(75) Inventors: Wolfgang Fleischer, Naperville, IL (US); Chinmei Chen Lee, Woodridge, IL (US); Zhibi Wang, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 890 days.

(21) Appl. No.: 09/815,854

(22) Filed: Mar. 23, 2001

(65) Prior Publication Data

US 2002/0137525 A1 Sep. 26, 2002

(51) Int. Cl.
*H04M 1/00* (2006.01)
(52) U.S. Cl. .............................. 455/456.3; 455/412.2; 455/412.1; 455/456.1
(58) Field of Classification Search ............. 455/456.1, 455/403, 457, 412.1, 412.2, 456.2, 456.3, 455/456.4, 456.5, 456.6
See application file for complete search history.

(56) References Cited

U.S. PATENT DOCUMENTS 5,920,821 A * 7/1999 Seazholtz et al. ........... 455/466
6,466,796 B1 * 10/2002 Jacobson et al. ......... 455/456.3
6,564,143 B1 * 5/2003 Alewine et al. ............. 701/207
2002/0068583 A1 * 6/2002 Murray ....................... 455/456
2002/0089958 A1 * 7/2002 Feder et al. ................. 370/338
2003/0060211 A1 * 3/2003 Chern et al. ................ 455/456
2004/0057442 A1 * 3/2004 Westman et al. ............ 370/401

FOREIGN PATENT DOCUMENTS

WO WO 99/45732 9/1999
WO WO 00/79811 A1 12/2000

OTHER PUBLICATIONS

European Search Report.

* cited by examiner

Primary Examiner—Sanh D Phu

(57) ABSTRACT

In this invention, a wireless terminal location is monitored and used to locate providers of a requested service that are proximate to the location of the wireless terminal. At least one of the providers located is selected and identified by name and/or telephone number and/or the location, etc., and this information is delivered to and stored in the directory of the wireless terminal. The process is repeated as necessary to update the list of service providers when the wireless terminal is transported to a new location area. The service providers located can represent any category of service desired such as emergency facilities (especially in a foreign country) such as paramedics, hospital, police, or roadside assistance, etc.

6 Claims, 2 Drawing Sheets

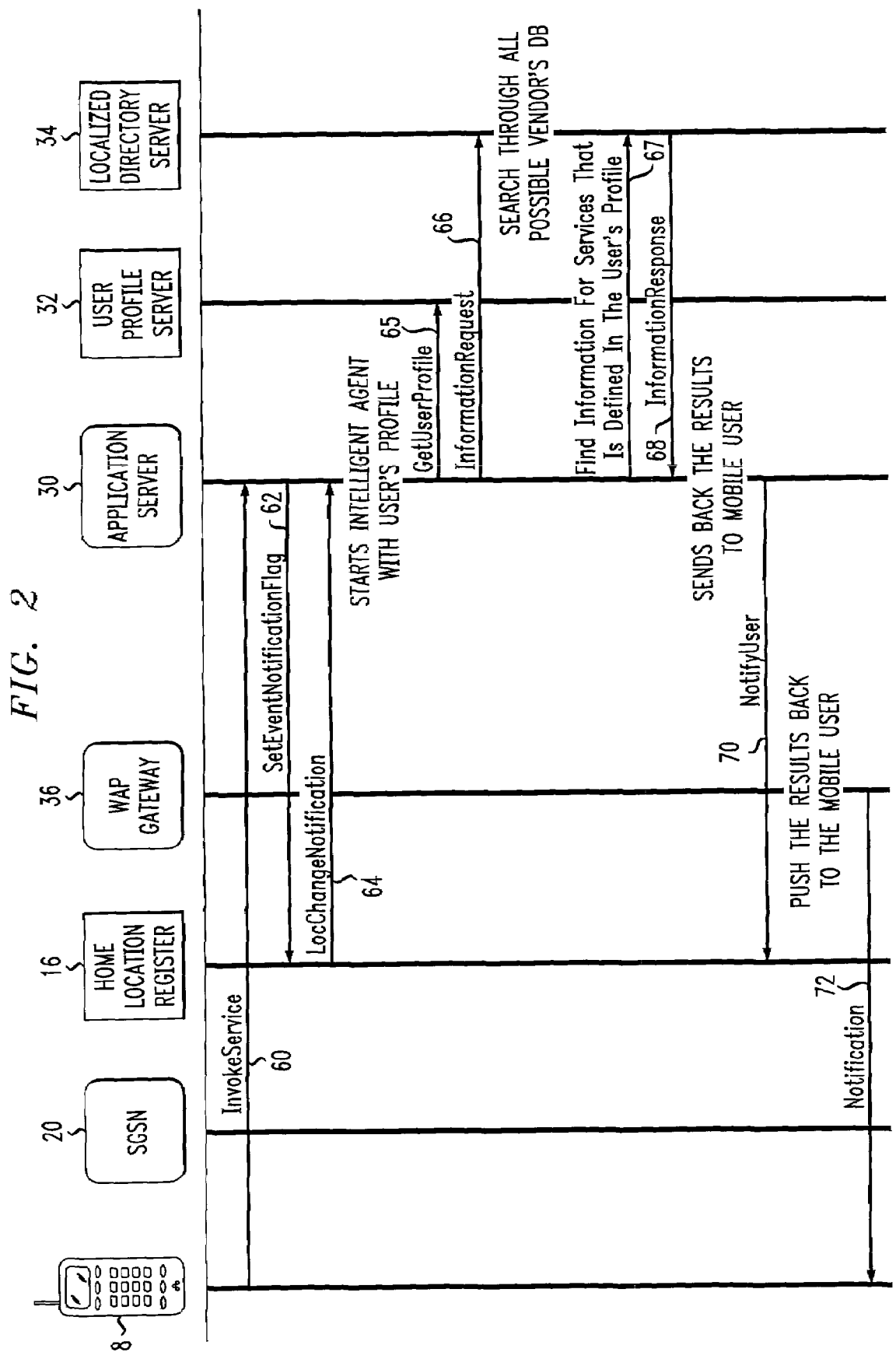

PROVIDING LOCATION BASED DIRECTORY NUMBERS FOR PERSONALIZED SERVICES

BACKGROUND OF THE INVENTION

1. Field of the Invention

The present invention relates generally to a method of providing a personalized telephone feature to a mobile telephone subscriber and, more particularly, to identifying a provider of a service located local to the current position of the mobile telephone where the type of service can be predefined by the mobile telephone subscriber and the identification of the provider of the service is dynamically updated as the subscriber roams to a new location.

2. Description of the Prior Art

A situation often experienced by a mobile telephone subscriber, whether in a vehicle or on foot in a remote and unfamiliar geographical area, is the need to obtain assistance, information and/or aid promptly. For example, in the case of a breakdown or disabling of the vehicle where roadside assistance is required, the person in need must select a most convenient and suitable provider of the required service. Under normal circumstances, this is at best difficult and highly time consuming. Even when the vehicle is provided with wireless communication, for example, a mobile telephone, the problem still exists in locating a service provider, and, in those instances where time is important, locating and obtaining the telephone number of the nearest service provider.

A similar situation occurs when a traveler, using a mobile telephone in a remote geographical area needs to reach a specific type of service provider in that area. Wireless telecommunication systems currently support the use of mobile terminals that are capable of both voice and data communication. These devices typically include an integrated wireless telephone and a software controlled data terminal that implements a micro browser for web surfing and other data communication activities. These features have been used to advantage by commercial entities, which have employed data network (e.g., Internet) servers to provide customer service information via web page documents sent to micro browser equipped wireless terminals. With their integrated telephony equipment, mobile terminals can request and receive such information while a subscriber is at any location served by the wireless network. As far is known, the mobile capabilities of a wireless terminal have not been exploited to include the personalization of customer service information which is wireless terminal location dependent.

The advantages of location-dependent personalization of customer service information are several. For example, a mobile terminal subscriber located in a remote geographical area (which can include a foreign country) can obtain and call the telephone number of a specific service such as a hotel, a restaurant etc.

What is desirable is a system that allows a mobile telephone subscriber to identify a provider of a service that is dependent on the current location of the mobile telephone. The service may be personalized by types, such as emergency service and directory service; or it may be by business chains, such as Hilton and McDonalds. It is envisioned that this service will be most useful when a traveler, using a wireless terminal, is desirous of reaching a specific service having a telephone number that is location dependent.

SUMMARY OF THE INVENTION

The foregoing problems are solved and an advance in the art is obtained by a novel method for identifying, to a mobile telephone subscriber, a provider of a specific service. If desired, the provider identified can be the provider located proximate to the current position of a mobile terminal in a wireless telecommunication network. According to this method, the mobile terminal location is monitored and used to locate providers of the specific service requested that are proximate to but not necessarily the nearest to the location of the mobile terminal. When a group of service providers are identified, one of the group of providers located can be selected and identified by name and/or telephone number, and/or location, etc., and this information is delivered to the mobile terminal for use by the subscriber. In a preferred embodiment, the location based directory numbers and, if desired, names of providers of a type of service selected by the subscriber are downloaded to the terminal, and the terminal then stores the obtained numbers and names as part of an address book. When the mobile terminal user wants to make a call to one of the obtained numbers in the address book, it is retrieved and presented to the user who then does a click to make the call. The process of obtaining fresh directory numbers and names is repeated as the mobile terminal travels to a new geographical location and the new information is substituted for the old information whenever the old information become invalid. The customer service information can represent any category of service desired such as, for example, a specific hotel of a chain, a restaurant, emergency facilities (especially in a foreign country) such as a hospital, police, etc.

BRIEF DESCRIPTION OF THE DRAWING

The features, aspects and advantages of the present invention will become better understood with regard to the following description, appended claims, and accompanying drawings where:

DETAILED DESCRIPTION OF THE PREFERRED EMBODIMENT

Figure 1:
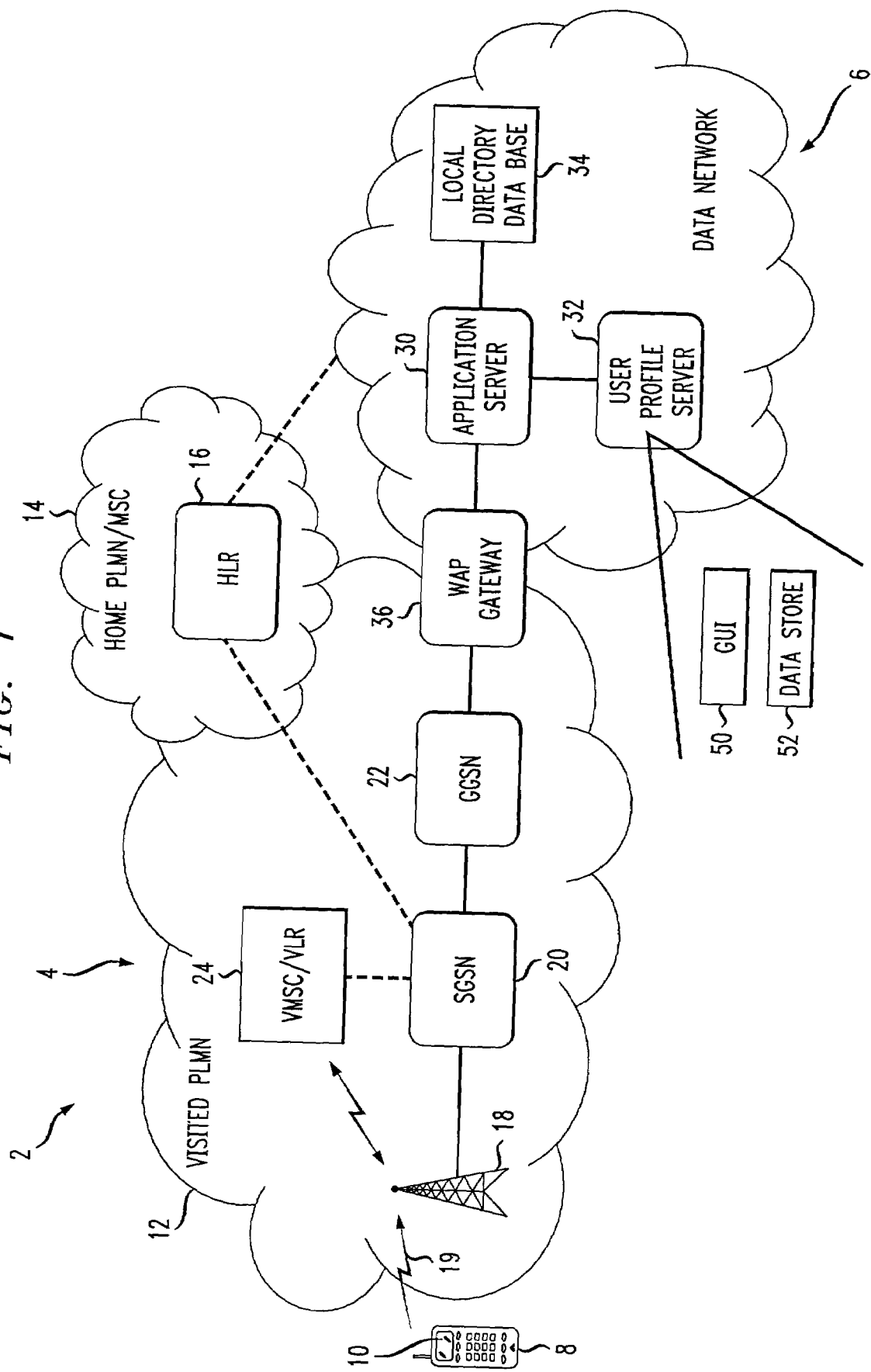
FIG. 1 is a functional block diagram showing a network architecture for a wireless telecommunication system that provides location based directory numbers and names for the types of services selected by the mobile terminal user in accordance with the invention; and, FIG. 2 is a flow diagram showing a series of method steps performed to implement customer service in accordance with the principles of the invention.

Turning now to the figures, wherein like reference numerals represent like elements in all of the several views, FIG. 1 illustrates a network architecture for a telecommunication system 2 that provides customer service in accordance with the present invention. As shown, the telecommunication system 2 includes a wireless network resource group 4 and a data network resource group 6. The wireless network resource group 4 can be implemented in a conventional wireless telephone network that has been enhanced to carry data. A wireless network capable of carrying circuit-switched data can be used for this purpose. More preferably, however, the wireless network resource group 4 provides packet-switched data service. An example of a wireless infrastructure include UMTS (Universal Mobile Telephone System), a "$3^{rd}$ Generation" wireless system based on GSM (Global System for Mobile communications). GSM adds a packet network overlay known as GRPS (GSM Packet Radio Service) to a wireless circuit voice network. It is thus ideally suited for implementing the wireless network resource group 4 of FIG. 1. The data network resource group 6 of FIG. 1 can be implemented using a conventional packet data network based on the IP (Internet Protocol) and/or ATM (Asynchronous Transfer Mode) protocols, and which also has wireless network access capability.

In the architecture of FIG. 1, a wireless terminal 8 is assumed to include an integrated wireless transceiver for voice and data delivery, and a software-controlled data terminal that includes a display 10. The wireless terminal 8 should be capable of displaying text messages, and may also implement a graphical user interface, such as a web browser or the like. By way of example only, the wireless terminal 8 can implement a WAP (Wireless Application Protocol) micro-browser to display WML (WAP Markup Language) documents. There are a variety of suitable wireless terminal products on the market today, and others in development. These include web enabled telephones, PDAs (Personal Digital Assistants), handheld computers, pagers and the like.

In FIG. 1, the wireless terminal 8 is further assumed to be roaming in a network that is not owned by the provider from which services are subscribed. As such, the wireless network resource group 4 is shown as including a visited PLMN (Public Land-based Mobile Network) 12 and a home PLMN 14. The home PLMN 14 is the network owned or operated by the provider from which services are subscribed, and the visited PLMN 12 serves the wireless terminal when it is roaming. The home PLMN 14 includes a home location register (HLR) 16. The home location register 16 implements a conventional HLR (Home Location Register) function that maintains generalized location information about wireless terminals under its jurisdiction (i.e., the network and vicinity of a mobile, such as the mobile's current location/routing area). The home location register 16 can also track intra-network (i.e., cell-to-cell) mobile terminal movement by initiating queries of base station resources in a mobile terminal's current PLMN, as described in more detail below. The home location register (HLR) 16 further includes an inter-working function for communicating wireless terminal location information to a data network (IP) resource group 6, and maintains an interface with an application server 30 (see below) in the data network resource group. Via this interface, the home location register 16 sets a location update notification flag at the request of the application server 30 and notifies the application server whenever there is a mobile terminal location change. The location change may be a change from one visited PLMN to another, or a change from one cell to another within the same PLMN.

The visited PLMN 12 includes a Base Station 18, a data switching node 20, a data network gateway (SGSN) 22, and a visitor location register (MSC/VLR) 24. The base station 18 communicates over an air interface 19 with the wireless terminal 8. The data switching node 20 is labeled "SGSN" (Serving GPRS Support Node) in FIG. 1 according to the UMTS designation for this component. Other wireless network standards may use other names. For example, the ANSI-41 standard for CDMA (Code Division Multiple Access) data networks use the terms "PCF" (Packet Control Function). Regardless of the implementation specific name applied, the data switching node 20 is a conventional router entity with mobility support capability that routes data traffic between the base station 18 and the data network resource group (IP) 6. The data switching node 20 also performs a conventional VLR (Visitor Location Register) function in terms of mobile location. It therefore reports to the HLR 16 whenever the mobile terminal 8 is operating within the jurisdiction of the visited PLMN 12.

The data network gateway 22 is labeled "GGSN" (Gateway GPRS Support Node) in FIG. 1, according to the UMTS designation for this component. Other wireless network standards may use other names. For example, the ANSI-41 standard for CDMA (Code Division Multiple Access) data networks use the term "PDSN" (Packet Data Serving Node). Regardless of the implementation specific name applied, the data network gateway 22 is a conventional routing entity that serves as a gateway that allows the wireless network resource group 4 to communicate with the data network resource group 6. The visitor location register 24 or the SGSN has the ability to report the location of the wireless terminal 8 to the home location register 16. The visitor location register or the SGSN can be programmed to report to the home location register 16 (via the data switching node 20) whenever a mobile terminal enters or leaves their jurisdiction.

The data network resource group 6 of FIG. 1 includes a data network application server 30, a user profile server 32, a localized directory server 34 and may include a wireless network gateway 36. It is to be noted that the WAP is slowly being phased out of the WAP standards. As previously described, the application server 30 also maintains an interface with the home location register 16. This interface is used by the application server 30 to request notification of mobile terminal location changes. The application server 30 similarly maintains interfaces with the user profile server 32. Note that each of these interfaces can be advantageously based on commonly used IETF (Internet Engineering Task Force)/W3C (World Wide Web Consortium) specifications, such as XML (eXtensible Markup Language) over HTTP (Hyper Text Transfer Protocol), etc.

The user profile server 32 is a data network entity that stores user profile information provided by a wireless subscriber. It includes a GUI (Graphical User Interface 50 (preferably implemented as one or more WWW web pages) that is programmed to prompt for and receive input regarding the customer service information desired by the subscriber. For example, if the subscriber wishes to be informed about services, the user profile information may include service types, serving company names or service chain names, etc. A data storage resource 52 associated with the user profile server 32 stores the user profile information received via the GUI 50. An interface in the user profile server is responsive to user profile information queries from the application server 30 and provides user profile information thereto upon request.

The local directory server 34 is a data network resource which may be operated by the local telephone provider, the participating service providers, or third party directory providers. These providers maintain local directory databases 34.

With additional reference now to FIG. 2, the foregoing entities of the wireless network resource group 4 and the data network resource group 6 are adapted to support an "on location" directory service. Prior to invoking service, the mobile subscriber must obtain a service subscription and establish a user profile. Although this can be done in a variety of ways, the most likely scenario is that the subscriber would access a URL to sign up for the service by entering information such as name, billing address, email address, initial user service profile, etc. Service profile information is stored in the user profile server 32. For the subscriber to manage the profile, a URL which may be the same or different from the one mentioned above can be accessed to do so. A profile management session can be performed whereby the new subscriber is able to specify his or her user profile information. Note that the subscriber will typically use the wireless terminal 8 to subscribe to the service and establish a user profile. Alternatively, the subscriber could perform these tasks using any other suitable network device, such as a personal computer or the like. It is desirable to allow wireless subscribers to request on demand that their profiles be updated to reflect their current interests. For that reason, the wireless terminal 8 can be programmed to provide a menu which may be presented to the user when the URL is accessed which allows the subscriber to perform profile management on demand.

After the subscription and the profile have been processed and stored, the application server will instruct the home location register 16 to set an event notification flag to notify the application server whenever a mobile terminal changes location. This is shown as step 62 of FIG. 2. The information of the services in the subscriber profile including the telephone numbers, address, etc. will be automatically updated whenever the mobile user moves to a new area. Alternatively, the wireless terminal 8 can make a request for an update of the information. In any event, after the mobile telephone subscriber has requested and is signed up for the service, when a request 60 is made to invoke the service, the wireless terminal 8 will communicate the request to the application server 30. The application server 30 will request the mobile terminal location from the home location register 16.

Pursuant to the event notification flag set per request of the application server 30, the home location register 16 will report the wireless terminal's location change information when a location change has occurred. Such a location change notification is received by the application server 30 in step 64 of FIG. 2. This causes several things to happen. The application server can be provisioned to define geographic areas that correlate with the mobile terminal location information provided by the home location server 16. Only when a mobile terminal moves from one area such as an area serviced by one base station to a second area serviced by a second base station will a new customer information request be performed. Each service area definition in the application server can contain information about the actual wireless cells, PLMNs, country, etc. that it encompasses, allowing rapid determination of the subscriber's service area location. An additional benefit of defining areas in the application server is that geographic information, rather than cellular information, can be specified to the local directory servers 34 as part of a customer information query. By way of example, it is easier to ask a local directory server 34 for an emergency service directory number, other than it is to request information based on wireless network PLMN location data.

Once the application server 30 determines that a mobile terminal's location warrants information update, one or more information requests are made in step 66 to the localized directory server(s) 34. Determination of the appropriate localized directory server(s) 34 requires that the application server consult the user profile server 32 (step 65) to find the information for the service defined in the user's profile (step 67), that being the local telephone number and/or address of a specific provider or providers from a generalized local directory.

In step 68, the localized directory server(s) 34, queried by the application content server 30, respond(s) with appropriate customer service information. In step 70, the application server 30 formats the customer service information as necessary and sends it to the wireless terminal 8. In a WAP implementation of the invention, the application server 30 acts as a WAP push proxy gateway that is programmed to form a document, such as a WML document, containing the customer service information and push to the mobile terminal.

In step 72 of FIG. 2, the wireless network gateway 36 delivers the WML document containing the customer service information to the mobile terminal 8. In a WAP implementation of the invention, the wireless terminal 8 will be a WAP-enabled client that interprets the WML document and stores the information in the mobile terminal's directory. Note that other interface formats between the application server 30 and the wireless terminal 8 could also be used, including HTML (Hypertext Markup Language, xHTML (extensible HTML), or cHTML (compact HTML) over HTTP or WSP (WAP Session Protocol) where WSP is used in conjunction with WML.

Accordingly, novel system and method for providing customer service are disclosed. The disclosed service advantageously allows mobile subscribers to obtain personalized information (information that is specifically identified and requested by the mobile subscriber) such as service provider telephone numbers based on mobile terminal location.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method of providing location-based directory numbers for personalized services for a wireless subscriber having a mobile terminal, the method comprising:

receiving a user profile for the mobile terminal from the subscriber at a user profile server, wherein the user profile includes information for at least one service that is dependent on the location of the mobile terminal, the information including one or more local directory numbers for each service;

storing the user profile at the user profile server, wherein the user profile server is in communication with an application server;

instructing a home location register to set an event notification flag to notify the application server whenever the mobile terminal changes location;

receiving a notification from the home location register that the location of the mobile terminal has changed;

automatically updating the local directory number for each service in the subscriber profile whenever the mobile terminal changes location; and forwarding at least one of the updated local directory numbers to the mobile terminal for use by the subscriber.

2. The method of claim 1, further comprising determining whether a change in location of the mobile terminal exceeds a location area size threshold.

3. The method of claim 2, wherein the location area threshold is based on the area served by a base station serving the mobile terminal.

4. A system for providing location-based directory numbers for personalized services for a wireless subscriber having a mobile terminal, the method comprising:

means for receiving a user profile for the mobile terminal from the subscriber, wherein the user profile includes information for at least one personalized service that is dependent on the location of the mobile terminal, the information including one or more local directory numbers for each service;

means for storing the user profile at the user profile server;

means for instructing a home location register to set an event notification flag to notify an application server whenever the mobile terminal changes location;

means for receiving a notification from the home location register that the location of the mobile terminal has changed;

means for automatically updating the local directory number for each service in the subscriber profile whenever the mobile terminal changes location; and means for forwarding at least one of the updated local directory numbers to the mobile terminal for use by the subscriber.

5. The system of claim 4, further comprising means for determining whether a change in location of the mobile terminal exceeds a location area size threshold.

6. The system of claim 5, wherein the location area threshold is based on the area served by a base station serving the mobile terminal.

* * * * *